(12) United States Patent
Nihonmatsu et al.

(10) Patent No.: US 9,302,598 B2
(45) Date of Patent: Apr. 5, 2016

(54) SEAT ADJUSTMENT APPARATUS FOR VEHICLE

(71) Applicant: Aisin Seiki Kabushiki Kaisha, Kariya (JP)

(72) Inventors: Hideo Nihonmatsu, Anjo (JP); Yoshihiro Fujita, Okazaki (JP)

(73) Assignee: AISIN SEIKI KABUSHIKI KAISHA, Kariya-Shi (JP)

( * ) Notice: Subject to any disclaimer, the term of this patent is extended or adjusted under 35 U.S.C. 154(b) by 92 days.

(21) Appl. No.: 14/220,237

(22) Filed: Mar. 20, 2014

(65) Prior Publication Data

US 2014/0284979 A1    Sep. 25, 2014

(30) Foreign Application Priority Data

Mar. 22, 2013   (JP) .................................. 2013-060546

(51) Int. Cl.
*B60N 2/02* (2006.01)
*B60N 2/22* (2006.01)
(Continued)

(52) U.S. Cl.
CPC ................. *B60N 2/0232* (2013.01); *B60N 2/22* (2013.01); *B60N 2/225* (2013.01); *B60N 2/682* (2013.01); *B60N 2002/024* (2013.01); *B60N 2002/0236* (2013.01); *B60N 2205/50* (2013.01)

(58) Field of Classification Search
CPC ...... B60N 2/0232; B60N 2/22; B60N 2/2356; B60N 2/682; B60N 2002/0236; B60N 2205/50
USPC .................. 297/463.1, 354.12, 62.11, 362.12
See application file for complete search history.

(56) References Cited

U.S. PATENT DOCUMENTS

| 4,470,633 A | * | 9/1984 | Fourrey | ................... B60N 2/22 16/DIG. 24 |
| 5,090,264 A | * | 2/1992 | Droulon | ................... B60N 2/22 403/229 |
| 6,095,608 A | * | 8/2000 | Ganot | .................. B60N 2/2358 297/367 R |

(Continued)

FOREIGN PATENT DOCUMENTS

DE    197 24 555 C1    11/1998
DE    198 22 649 C1    11/1999
(Continued)

OTHER PUBLICATIONS

Machine Translation of DE 19724555—Aug. 17, 2015, worldwide.esapcenet.com.*

(Continued)

*Primary Examiner* — Ryan Kwiecinski
(74) *Attorney, Agent, or Firm* — Oblon, McClelland, Maier & Neustadt, L.L.P.

(57) ABSTRACT

A seat adjustment apparatus for a vehicle includes a pair of seat adjustment mechanisms, a drive source positioned close to one of the pair of seat adjustment mechanisms and far from the other one of the pair of seat adjustment mechanisms, and a connecting member transmitting a drive power to the pair of seat adjustment mechanisms, wherein the connecting member includes a first portion transmitting the drive power to the one of the pair of seat adjustment mechanisms and having a first torsional rigidity, the connecting member includes a second portion transmitting the drive power to the other one of the pair of seat adjustment mechanisms and having a second torsional rigidity, and the first torsional rigidity differs from the second torsional rigidity.

20 Claims, 8 Drawing Sheets

(51) Int. Cl.
*B60N 2/68* (2006.01)
*B60N 2/225* (2006.01)

(56) References Cited

U.S. PATENT DOCUMENTS

| | | | | |
|---|---|---|---|---|
| 7,314,250 | B1* | 1/2008 | Eblenkamp | B60N 2/0232 297/362 |
| 7,543,893 | B2* | 6/2009 | LaPointe | A47C 1/0355 16/422 |
| 2004/0036338 | A1* | 2/2004 | Lardais | B60N 2/2356 297/367 R |
| 2005/0099049 | A1* | 5/2005 | Spey | B60N 2/22 297/361.1 |
| 2007/0039183 | A1* | 2/2007 | Krambeck | B60N 2/22 29/897.2 |
| 2008/0309138 | A1* | 12/2008 | Kiehler | B60N 2/22 297/378.11 |
| 2012/0086253 | A1* | 4/2012 | Nock | B60N 2/2356 297/354.12 |

FOREIGN PATENT DOCUMENTS

| | | |
|---|---|---|
| DE | 10 2005 039 903 B3 | 12/2006 |
| FR | 2 873 964 A1 | 2/2006 |
| FR | 2 941 180 A1 | 7/2010 |
| JP | 2001-37571 | 2/2001 |
| JP | 2010-504876 | 2/2010 |
| JP | 2011-225101 A | 11/2011 |

OTHER PUBLICATIONS

Machine Translation of JP 2011225101A—Aug. 13, 2015—https://dossier1.j-platpat.inpit.go.jp/tri/all/odse/ODSE_GM101_Top.action.*

Extended European Search Report issued Jun. 24, 2014 in Patent Application No. 14160827.3.

* cited by examiner

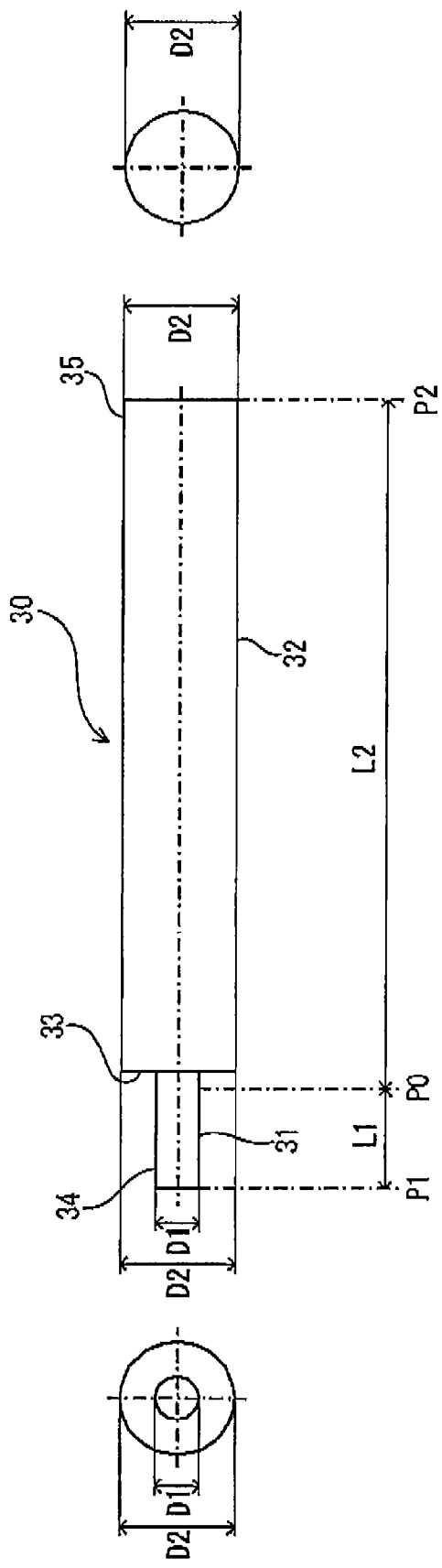

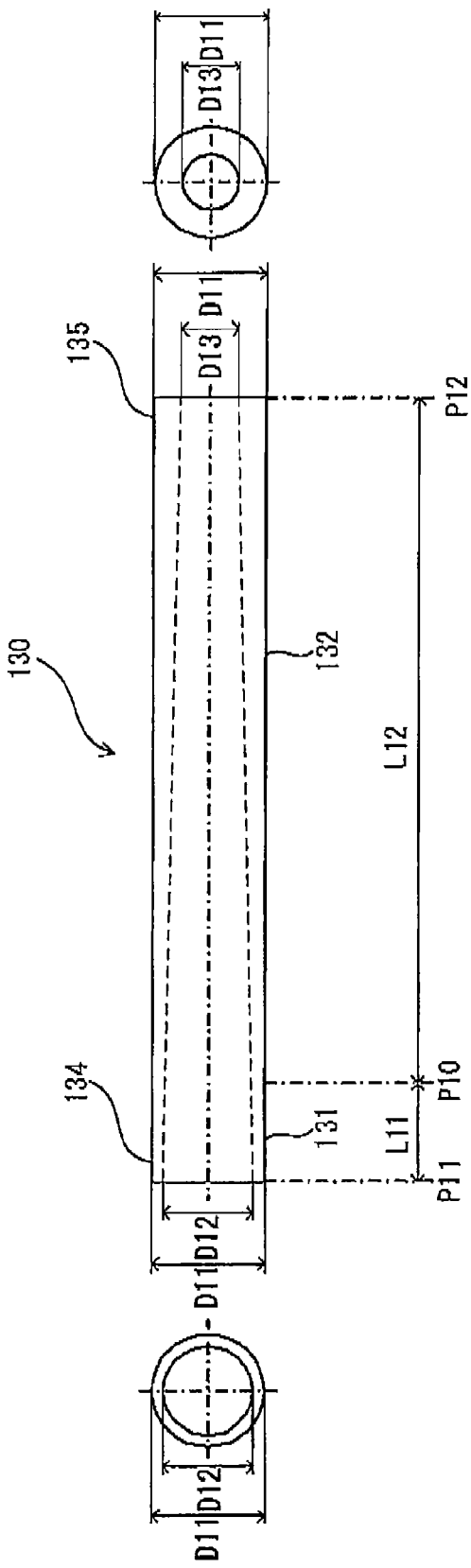

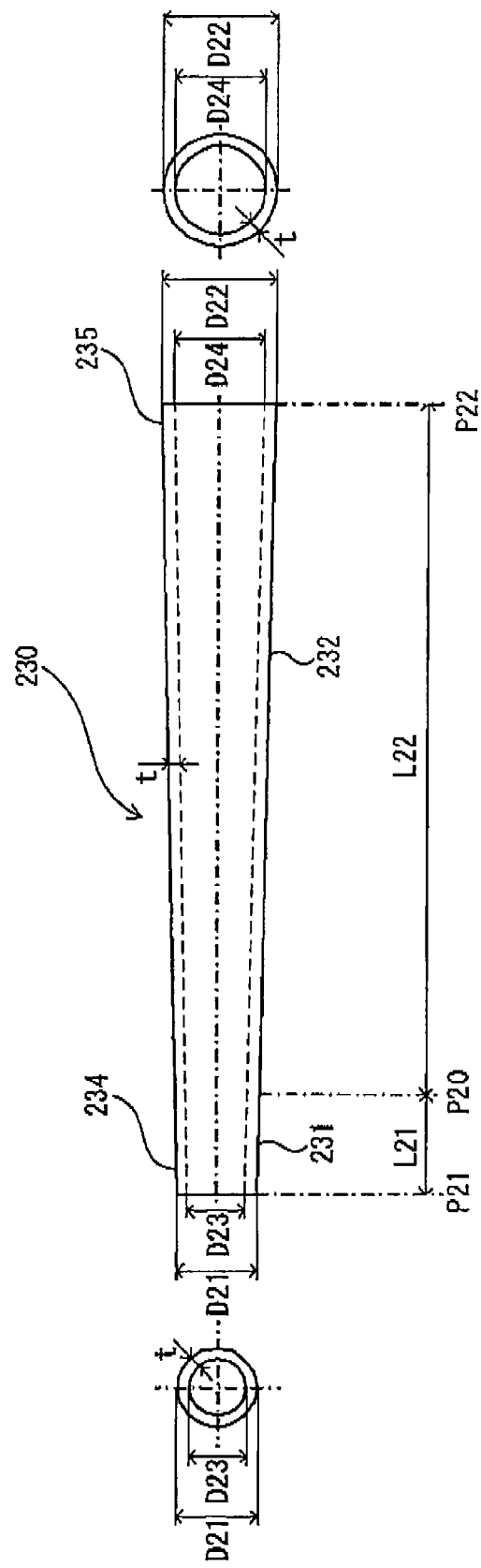

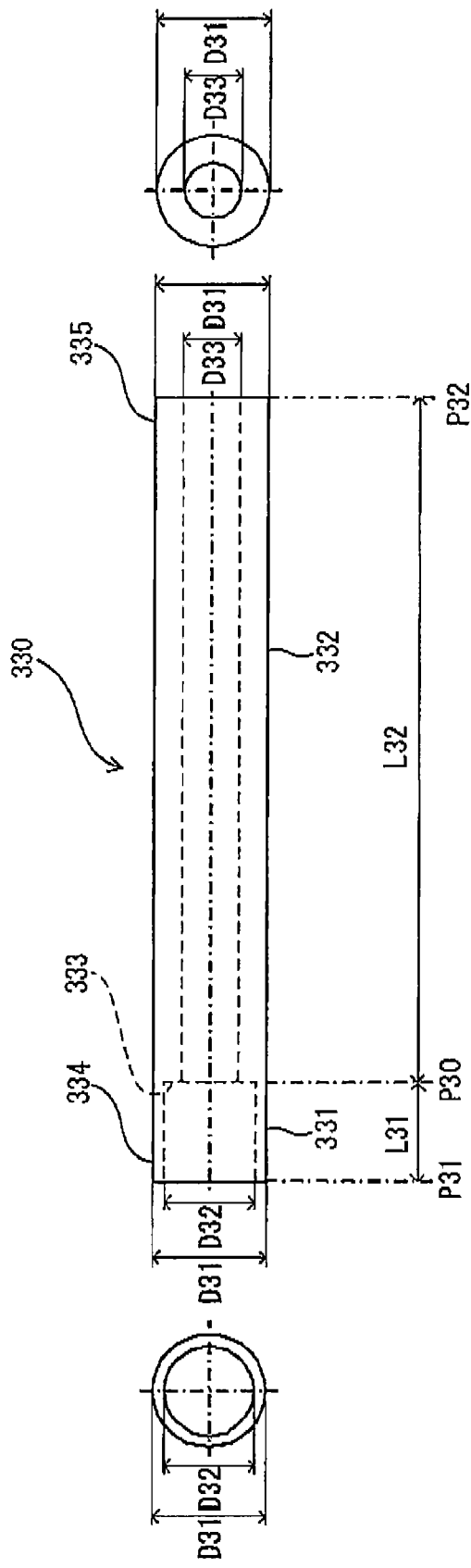

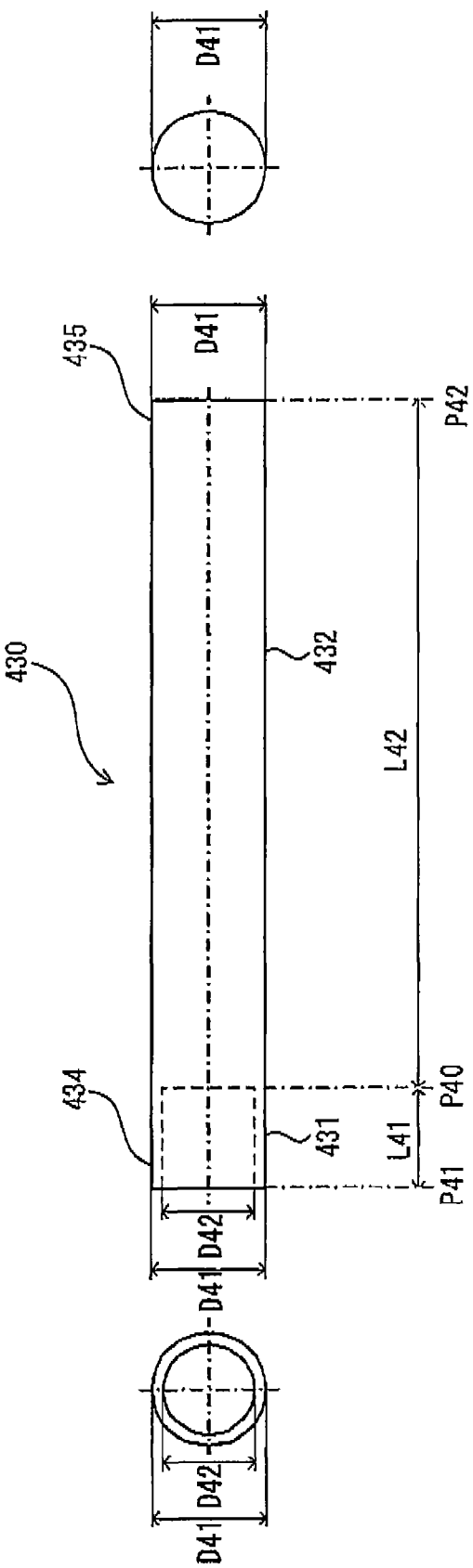

SEAT ADJUSTMENT APPARATUS FOR VEHICLE

CROSS REFERENCE TO RELATED APPLICATIONS

This application is based on and claims priority under 35 U.S.C. §119 to Japanese Patent Application 2013-060546, filed on Mar. 22, 2013, the entire content of which is incorporated herein by reference.

TECHNICAL FIELD

This disclosure generally relates to a seat adjustment apparatus for a vehicle.

BACKGROUND DISCUSSION

A seat adjustment apparatus for a vehicle is known, at which a seat adjustment mechanism is driven with an electric motor, and thus the seat for the vehicle is adjusted. JP2010-504876T (which will be hereinafter referred to as Patent reference 1) discloses the known seat adjustment apparatus for the vehicle at which a reclining mechanism serving as the seat adjustment mechanism is driven with the electric motor, and thus a backrest angle of a seatback (the backrest) relative to a seat cushion (a seating portion) is adjusted.

According to the Patent reference 1, the reclining mechanism is arranged at each of the right side and the left side relative to the seat for the vehicle. The reclining mechanisms connect the seat cushion and the seatback to each other so that the backrest angle of the seatback relative to the seat cushion is adjustable. The reclining mechanisms, which are arranged at the right and left sides as a pair, are connected to each other by a connecting shaft (a connecting member). The reclining mechanisms are attached to end portions of the connecting shaft, respectively. The electric motor rotates the connecting shaft. Upon being rotated, the connecting shaft drives the pair of reclining mechanism so that the angle of the seatback is adjusted.

Generally, the electric motor is provided inside the seatback. The electric motor is generally arranged close to either one of the right side and left side relative to the seatback. This is because the electric motor interferes with an occupant's upper back portion and/or lower back portion in a case where the electric motor is arranged in a center of the seatback.

Recently, for a purpose of weight reduction, the connecting shaft is required to be formed thinner. In a case where the connecting shaft is formed to be thinner, a rotation angle (an angle of torsion) of an end portion of the connecting shaft, which is positioned at a side far from the electric motor, may be larger than a rotation angle of an end portion of the connecting shaft, which is positioned at a side close to the electric motor. Because a configuration of a cross section of the connecting shaft is uniform in an axial direction thereof, the rotation angle of an end portion of the connecting shaft increases in proportion to a distance to the end portion from a portion at which a rotary force is inputted. Accordingly, in a case where the reclining mechanisms arranged at the right and left sides, respectively, are actuated with the same torque, the rotation angle of the end portion that is positioned far from the electric motor is larger than the rotation angle of the end portion that is positioned close to the electric motor. In a case where the rotation angles of the respective end portions of the connecting shaft differ from each other, a difference in operation amounts is generated between the reclining mechanisms, which are provided as the pair, at the beginning of the operation of the seat adjustment apparatus for the vehicle after the start-up of the apparatus. The difference in the operation amounts leads to delay in a starting time of the operation of one of the reclining mechanisms compared to that of the other one of the reclining mechanisms. As a result, the occupant feels uncomfortable at the beginning of the operation of the seat adjustment apparatus for the vehicle after the start-up of the apparatus. This disclosure provides a seat adjustment apparatus for a vehicle, at which a difference in operation amounts between a pair of seat adjustment mechanisms is reduced.

A need thus exists for a seat adjustment apparatus for a vehicle which is not susceptible to the drawback mentioned above.

SUMMARY

According to an aspect of this disclosure, a seat adjustment apparatus for a vehicle, the seat adjustment apparatus includes a pair of seat adjustment mechanisms for adjusting a seat for the vehicle, a drive source provided between the pair of seat adjustment mechanisms, the drive source being positioned close to one of the pair of seat adjustment mechanisms and being positioned far from the other one of the pair of seat adjustment mechanisms, and a connecting member transmitting a drive power from the drive source to the pair of seat adjustment mechanisms, wherein the connecting member includes a first portion transmitting the drive power to the one of the pair of seat adjustment mechanisms and having a first torsional rigidity, the connecting member includes a second portion transmitting the drive power to the other one of the pair of seat adjustment mechanisms and having a second torsional rigidity, and the first torsional rigidity differs from the second torsional rigidity.

BRIEF DESCRIPTION OF THE DRAWINGS

The foregoing and additional features and characteristics of this disclosure will become more apparent from the following detailed description considered with the reference to the accompanying drawings, wherein:

FIG. 3A is a schematic view for describing a connecting shaft of the first embodiment;

FIG. 3B is a schematic view for describing the connecting shaft of the first embodiment;

FIG. 3C is a schematic view for describing the connecting shaft of the first embodiment;

FIG. 5A is a schematic view for describing a connecting shaft of a second embodiment;

FIG. 5B is a schematic view for describing the connecting shaft of the second embodiment;

FIG. 5C is a schematic view for describing the connecting shaft of the second embodiment;

FIG. 6A is a schematic view for describing a connecting shaft of a third embodiment;

FIG. 6B is a schematic view for describing the connecting shaft of the third embodiment;

FIG. 6C is a schematic view for describing the connecting shaft of the third embodiment;

FIG. 7A is a schematic view for describing a connecting shaft of a fourth embodiment;

FIG. 7B is a schematic view for describing the connecting shaft of the fourth embodiment;

FIG. 7C is a schematic view for describing the connecting shaft of the fourth embodiment;

FIG. 8A is a schematic view for describing a connecting shaft of a fifth embodiment;

FIG. 8B is a schematic view for describing the connecting shaft of the fifth embodiment; and FIG. 8C is a schematic view for describing the connecting shaft of the fifth embodiment.

DETAILED DESCRIPTION

Embodiments disclosed here will be described hereunder with reference to the drawings.

Figure 1:
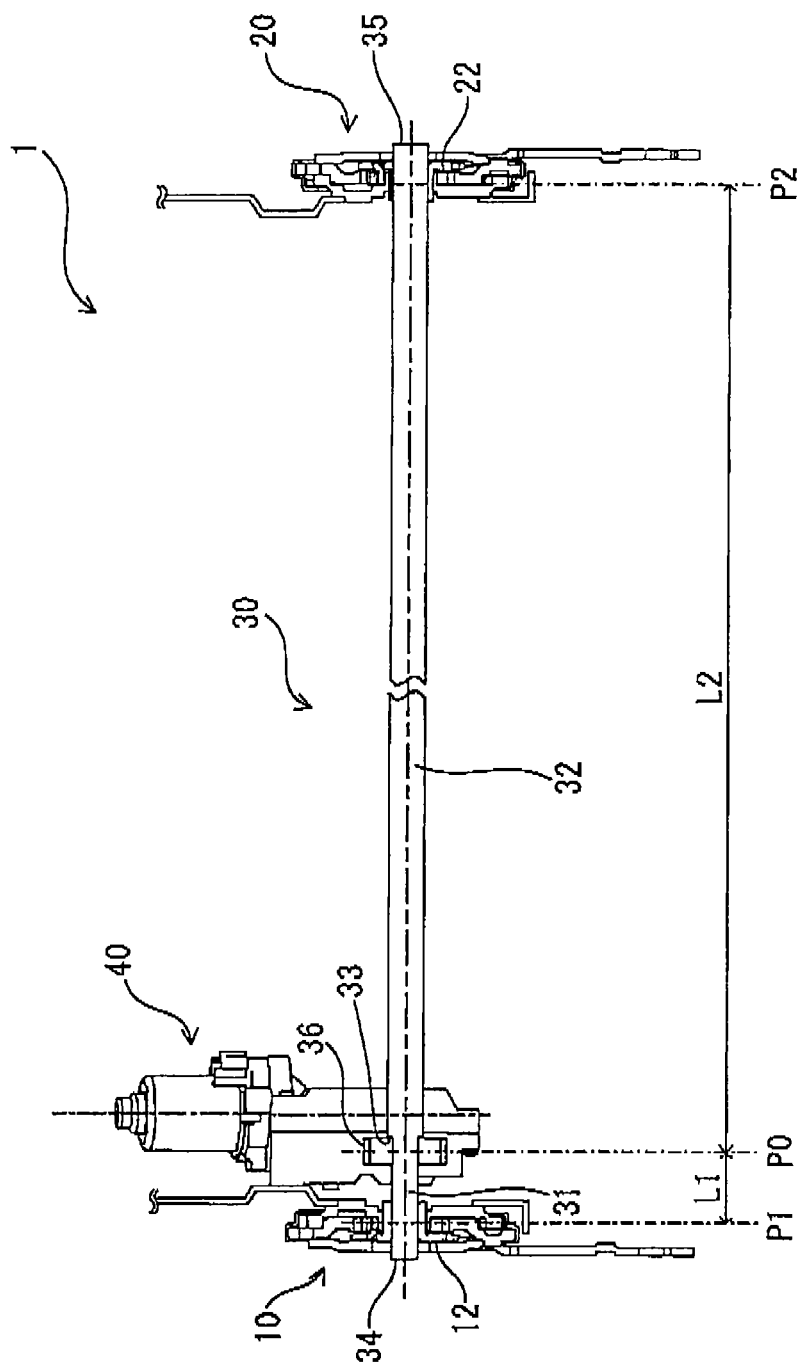
FIG. 1 is a view illustrating a seat adjustment apparatus according to a first embodiment disclosed here.

A first embodiment will be described hereunder. FIG. 1 is a view illustrating a seat adjustment apparatus 1 for a vehicle (which will be also referred to as the seat adjustment apparatus 1) according to the first embodiment. The seat adjustment apparatus 1 includes first and second reclining mechanisms 10, 20 (backrest angle adjustment mechanisms) serving as seat adjustment mechanisms), a connecting shaft 30 (i.e., a connecting member) connecting the first and second reclining mechanisms 10, 20 to each other and an electric motor 40 (i.e., a drive source) for rotating the connecting shaft 30.

The connecting shaft 30 is a stepped bar or a stepped rod including different cross-sectional configurations. The connecting shaft 30 includes a first portion 31 including a small diameter and a second portion 32 including a large diameter. The connecting shaft 30 includes a step portion 33 provided between the first portion 31 including the small diameter and the second portion 32 including the large diameter. The connecting shaft 30 is a drive power transmission member transmitting a drive power of the electric motor 40 to the plural reclining mechanisms 10, 20.

Between the first reclining mechanism 10 (a first adjustment mechanism) and the second reclining mechanism 20 (a second adjustment mechanism), the electric motor 40 is connected to the connecting shaft 30 via a gear 36 (a drive power input member). The gear 36 is attached to the connecting shaft 30 at a drive power input position PO that is provided at the first portion 31, which includes the small diameter, of the connecting shaft 30. The gear 36 is fixed to the connecting shaft 30 so as to rotate integrally with the connecting shaft 30. A rotational driving force from the electric motor 40 is transmitted to the gear 36 via a transmission mechanism.

The electric motor 40 rotates the connecting shaft 30 via the gear 36. The electric motor 40 is arranged between the first and second reclining mechanisms 10, 20, at a position other than a center position between the first and second reclining mechanisms 10, 20. That is, the electric motor 40 is arranged close to either one of the first reclining mechanism 10 or the second reclining mechanism 20. In this embodiment the electric motor 40 is connected via the gear 36 to the connecting shaft 30 so as to be close to the first reclining mechanism 10 (one of the reclining mechanisms), and to be away from the second reclining mechanism 20 (the other one of the reclining mechanisms).

The first and second reclining mechanisms 10, 20 are attached to a seat 50 for the vehicle (FIG. 2) at the right side and the left side relative to the seat 50 for the vehicle, respectively. The first reclining mechanism 10 includes a first rotation portion 12. In a case where the first rotation portion 12 rotates, the first reclining mechanism 10 operates. The second reclining mechanism 20 includes a second rotation portion 22. In a case where the second rotation portion 22 rotates, the second reclining mechanism 20 operates.

The first rotation portion 12 of the first reclining mechanism 10 is attached to the first portion 31 of the connecting shaft 30 at a first drive power output position P1 which is provided at a first end portion 34 of the connecting shaft 30. The first rotation portion 12 is rotated by the connecting shaft 30. At the first drive power output position P1, the rotational driving force of the electric motor 40 is outputted from the first portion 31 to the first reclining mechanism 10 via the first rotation portion 12.

The second rotation portion 22 of the second reclining mechanism 20 is attached to the second portion 32 of the connecting shaft 30 at a second drive power output position P2 which is provided at a second end portion 35 of the connecting shaft 30. The second rotation portion 22 is rotated by the connecting shaft 30. At the second drive power output position P2, the rotational driving force of the electric motor 40 is outputted from the second portion 32 to the second reclining mechanism 20 via the second rotation portion 22.

Figure 2:
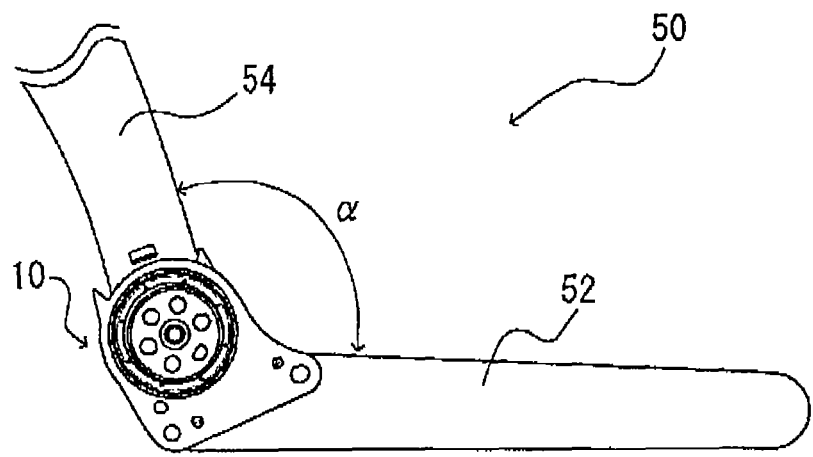
FIG. 2 is a view illustrating a reclining mechanism attached to a seat for a vehicle.

FIG. 2 is a view illustrating the first reclining mechanism 10 attached to the seat 50 for the vehicle (which will be also referred to as the seat 50). The second reclining mechanism 20 includes the same configuration or a symmetrical configuration relative to the configuration of the first reclining mechanism 10, and performs the same operation as that of the first reclining mechanism 10. The seat 50 includes a seat cushion 52 (a seating portion) and a seatback 54 (a backrest). The first and second reclining mechanisms 10, 20 connect the seatback 54 to the seat cushion 52 in a manner that that the seatback 54 is rotatable relative to the seat cushion 52 so that a backrest angle a of the seatback 54 relative to the seat cushion 52 is adjustable.

In a case where the connecting shaft 30 is rotated by the electric motor 40, the connecting shaft 30 rotates the first and second rotation portions 12, 22. As the first and second rotation portions 12, 22 rotate, the first and second reclining mechanisms 10, 20 operate and thus the backrest angle a of the seatback 54 is adjusted.

Each of FIGS. 3A to 3C is a schematic view for describing the connecting shaft 30, which is a solid shaft. The connecting shaft 30 includes the step portion 33 and an outer diameter of the connecting shaft 30 changes at the step portion 33. In each of FIGS. 3A to 3C, the connecting shaft 30 is illustrated schematically for convenience of the explanation. FIG. 3A is a side view of the connecting shaft 30 seen from a direction of the first end portion 34. FIG. 3B is a front view of the connecting shaft 30. FIG. 3O is a side view of the connecting shaft 30 seen from a direction of the second end portion 35. In each of FIGS. 3A and 3C, a cross section of the connecting shaft 30 is illustrated as a circle. However, the cross section of the connecting shaft 30 is not limited to the circular shape, and may have a polygon shape, including, for example, a triangular shape, a rectangular shape, a pentagonal shape, a hexagonal shape, an octagonal shape, or may have an elliptical shape. In addition, the connecting shaft 30 may be a spline shaft (a shaft with grooves provided thereto) or a serrated shaft.

Figure 4A:
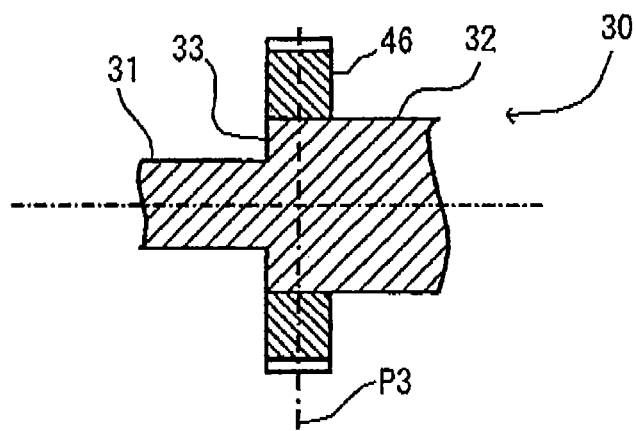
FIG. 4A is a cross-sectional view illustrating a drive power input position at which a gear (a drive power input member) is attached.
Figure 4B:
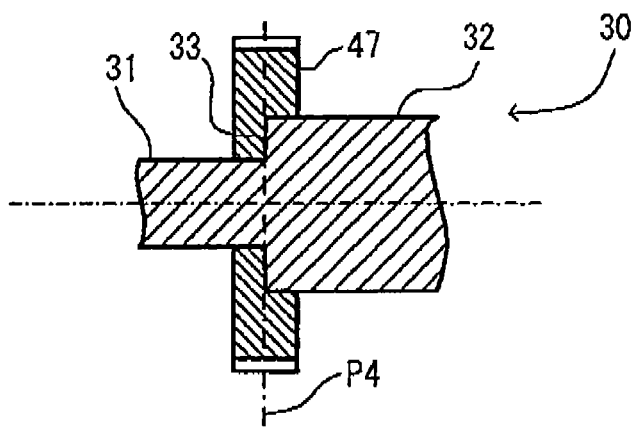
FIG. 4B is a cross-sectional view illustrating the drive power input position at which the gear (the drive power input member) is attached.
Figure 4C:
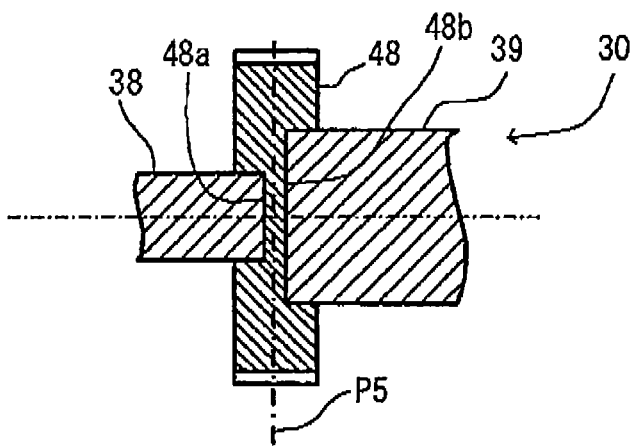
FIG. 4C is a cross-sectional view illustrating the drive power input position at which the gear (the drive power input member) is attached.

The drive power input position P0, at which the gear 36 is attached to the connecting shaft 30, is provided at the first portion 31 including the small diameter, in a vicinity of the step portion 33. This embodiment, however, is not limited thereto. Each of FIGS. 4A to 4C is a view illustrating the drive power input position, at which the gear (the drive power input member) is attached. As illustrated in FIG. 4A, a gear 46 transmitting the drive power from the electric motor 40 to the connecting shaft 30 may be attached to a drive power input position P3 which is provided at the second portion 32 including the large diameter in a vicinity of the step portion 33. Alternatively, as illustrated in FIG. 4B, a gear 47 transmitting the drive power from the electric motor 40 to the connecting shaft 30 may be attached to a drive power input position P4 which is provided at a position of the step portion 33. The gear 47 is attached to both of the first portion 31 including the small diameter and to the second portion 32 including the large diameter. In addition, in a case where the connecting shaft 30 is formed by two separate shafts, that is, a small diameter shaft 38 and a large diameter shaft 39, as illustrated in FIG. 4C, a gear 48 transmitting the drive power from the electric motor 40 to the connecting shaft 30 may be attached to a drive power input position P5 which is provided between the small diameter shaft 38 and the large diameter shaft 39. The gear 48 includes a fixing portion 48a fixing the small diameter shaft 38 and a fixing portion 48b fixing the large diameter shaft 39, and functions as a combining member combining the small diameter shaft 38 and the large diameter shaft 39 with each other.

As illustrated in FIG. 3A, the cross section of the first portion 31 is formed in the circular shape which includes a diameter D1. As illustrated in FIG. 3B, the cross section of the second portion 32 is formed in the circular shape which includes a diameter D2. A torsional rigidity or a torsional stiffness of the first portion 31 differs from a torsional rigidity of the second portion 32. Because the diameter D1 of the first portion 31 is smaller than the diameter $\phi 2$ of the second portion 32, a first torsional rigidity $\phi 1$ of the first portion 31 is smaller than a second torsional rigidity $\phi 2$ of the second portion 32. A length L1 from the drive power input position P0 to the first drive power output position P1 is shorter than a length L2 from the drive power input position P0 to the second drive power output position P2. Because the drive power input position P0 is provided in a vicinity of the step portion 33, a length of the first portion 31 of the connecting shaft 30 may be schematically considered as the length L1 and a length of the second portion 32 of the connecting shaft 30 may be schematically considered as the length L2. Consequently, in this embodiment, the first torsional rigidity $\phi$ of the first portion 31 including the short length L1 is smaller than the second torsional rigidity $\phi 2$ of the second portion 32 including the long length L2 ($\phi 1 < \phi 2$).

In a case where the seat adjustment apparatus 1 is brought to be started to adjust the backrest angle a of the seatback 54 relative to the seat cushion 52, a first torque T1 needed for operating the first reclining mechanism 10 and a second torque T2 needed for operating the second reclining mechanism 20 are assumed to be equal to each other (T1=T2). In order to prevent the occupant from feeling uncomfortable, a rotation angle $\theta 1$ (an operation amount) of the first rotation portion 12 of the first reclining mechanism 10 relative to the drive power input position P0 is set to be same as a rotation angle $\theta 2$ (an operation amount) of the second rotation portion 22 of the second reclining mechanism 20 relative to the drive power input, position P0. In that case, if a shear modulus of elasticity is fixed, that is, unchanged, and the torque is the same, a ratio of the first torsional rigidity $\phi 1$ of the first portion 31 to the second torsional rigidity $\phi 2$ of the second portion 32 is proportional to a ratio of the length L1 of the first portion 31 to the length L2 of the second portion 32. That is, the longer the length is, the larger the torsional rigidity needs to be. In order to increase the torsional rigidity, a polar moment of inertia of area may be increased.

Because the connecting shaft 30 includes the circular-shaped cross section in this embodiment, a ratio of the diameter D1 of the first portion 31 to the diameter D2 of the second portion 32 is proportional to the fourth root of the ratio of the length L1 to the length L2. For example, when L1:L2=1:16, D1:D2=1:2 may be set. Accordingly, by providing different polar moments of inertia of area to the first portion 31 and to the second portion 32 from each other, the first torsional rigidity $\phi 1$ of the first portion 31 and the second torsional rigidity $\phi 2$ of the second portion 32 may be set.

Alternatively, the torsional rigidity may be changed by changing a shear modulus of elasticity of material. The first torsional rigidity $\phi 1$ of the first portion 31 and the second torsional rigidity $\phi 2$ of the second portion 32 may be set by using different materials for the first portion 31 and the second portion 32, and thereby providing different shear moduli of elasticity to the first portion 31 and the second portion 32 from each other. According to this embodiment, at the beginning of the operation of the seat adjustment apparatus 1 after the electric motor 40 is actuated, the difference is reduced between the rotation angle $\theta 1$ and the rotation angle $\theta 2$. The rotation angle $\theta 1$ is the rotation angle of the connecting shaft 30 at the first drive power output position P1 relative to the drive power input position P0. The rotation angle $\theta 2$ is the rotation angle of the connecting shaft 30 at the second drive power output position P2 relative to the drive power input position P0. Accordingly, the first reclining mechanism 10 and the second reclining mechanism 20 are operated in synchronization with each other when the seat adjustment apparatus 1 is started to operate, and thus a sense of discomfort is not caused to the occupant of the seat 50.

In a case where a sliding resistance, including, for example, a seatbelt, is provided at the seat 50 for the vehicle, at a side at which the first reclining mechanism 10 is arranged, the first torque T1 needed to actuate the first reclining mechanism 10 is larger than the second torque T2 needed to actuate the second reclining mechanism 20 (T1>T2). That is, the torque of one of the plural seat adjustment mechanisms may be larger than the torques of the other respective adjustment mechanisms. In such a case, if the shear modulus of elasticity is fixed, that is, unchanged, and the ratio of the lengths is fixed, that is, unchanged, the ratio of the first torsional rigidity $\phi 1$ of the first portion 31 to the second torsional rigidity $\phi 2$ of the second portion 32 is proportional to the ratio of the first torque T1 to the second torque T2. That is, the larger the torque is, the larger, the torsional rigidity needs to be. In a case where the first torque T1 for driving the first reclining mechanism 10 and the second torque T2 for driving the second reclining mechanism 20 differ from each other, the first torsional rigidity $\phi 1$ and the second torsional rigidity $\phi 2$ are set so that the first torque T1 is generated at the first drive power output position P1 and the second torque T2 is generated at the second drive power output position P2. By setting the first torsional rigidity $\phi 1$ of the first portion 31 and the second torsional rigidity $\phi 2$ of the second portion 32 appropriately in consideration of the ratio of the first torque T1 to the second torque 12, the rotation angle $\theta 1$ of the first rotation portion 12 of the first reclining mechanism 10 and the rotation angle $\theta 2$ of the second rotation portion 22 of the second reclining mechanism 20 are brought to be the same.

In a case where the first torque T1 needed to actuate the first reclining mechanism 10 is significantly larger than the second torque T2 needed to actuate the second reclining mechanism

20, the first torsional rigidity φ1 of the first portion 31 including the short length L1 may be larger than the second torsional rigidity φ2 of the second portion 32 including the long length L2 (φ1>φ2).

In this embodiment, the connecting shaft 30 includes the different shapes of the cross section and the different shapes are defined by the different diameters. However, for example, the shape of the cross section of the connecting shaft 30 may be changed at an intermediate portion in an axial direction thereof. For example, the cross section of the first portion 31 may include a rectangular shape and the cross section of the second portion 32 may include a hexagonal shape. Accordingly, the torsional rigidities of the first portion 31 and the second portion 32 differ from each other.

In this embodiment, the first portion 31 and the second portion 32 are formed integrally with each other. However, the first portion 31 and the second portion 32 may be formed to be separate from each other. For example, as illustrated in FIG. 4C, the connecting shaft 30 may include the first portion 38, that is, the small diameter shaft 38, and the second portion 39, that is, the large diameter shaft 39, and the first portion 38 and the second portion 39 may be connected to each other by means of the gear 48. The first portion 38 and the second portion 39 may be made of different materials from each other. In a case where the first portion 38 and the second portion 39 are made of different materials of which the shear moduli of elasticity differ from each other (for example, iron and steel, and resin), the torsional rigidities of the first portion 38 and the second portion 39 differ from each other.

According to this embodiment, by providing the different torsional rigidities to the first portion and the second portion of the connecting shaft, at the early stage after the start-up of the operation, the difference in the operation amounts between the first reclining mechanism and the second reclining mechanism may be reduced. Accordingly, the first reclining mechanism and the second reclining mechanism start operating at approximately the same time, and therefore the occupant does not have an unpleasant feeling.

Next, a second embodiment will be described with reference to FIGS. 5A to 5C. A configuration of a connecting shaft of a seat adjustment apparatus for a vehicle according to the second embodiment differs from that of the seat adjustment apparatus 1 for the vehicle of the first embodiment illustrated in FIGS. 1 to 4C. The other configurations of the seat adjustment apparatus of the second embodiment are almost same as those of the first embodiment. In the second embodiment, the same reference numerals designate the same configuration as those of the first embodiment, and the explanation thereabout will be omitted. A connecting shaft 130 (i.e., the connecting member) of the second embodiment, whose configuration differs from that of the first embodiment, will be mainly described hereunder.

The connecting shaft may be a hollow shaft of which outer diameter is uniform and of which thickness changes gradually in the axial direction. Each of FIGS. 5A to 5C is a schematic view for describing the hollow connecting shaft 130 of which the outer diameter is uniform and of which the inner diameter changes gradually. In each of FIGS. 5A to 5C, the connecting shaft 130 is illustrated schematically for convenience of the explanation. FIG. 5A is a side view of the connecting shaft 130 seen from a direction of a first end portion 134 of the connecting shaft 130. FIG. 5B is a front view of the connecting shaft 130. FIG. 5C is a side view of the connecting shaft 130 seen from a direction of a second end portion 135 of the connecting shaft 130.

An outer diameter D11 of the connecting shaft 130 is uniform. The rotational driving force from the electric motor 40 is transmitted to a gear (the drive power input member) which is arranged at the connecting shaft 130 in a vicinity of the first end portion 134. An inner diameter D12 of the first end portion 134 which is close to the gear is larger than an inner diameter D13 of the second end portion 135 which is far from the gear. The inner diameter of the hollow connecting shaft 130 is reduced linearly from the inner diameter D12 of the first end portion 134 to the inner diameter D13 of the second end portion 135 (D12>D13). That is, the thickness of the connecting shaft 130, which is the hollow shaft, increases gradually from the first end portion 134 to the second end portion 135.

The gear is attached to the connecting shaft 130 at a drive power input position P10. The first end portion 134 of the connecting shaft 130 is attached to the first reclining mechanism 10 at a first drive power output position P11. The second end portion 135 of the connecting shaft 130 is attached to the second reclining mechanism 20 at a second drive power output position P12. A length L11 of a first portion 131 between the drive power input position P10 and the first drive power output position P11 is shorter than a length L12 of a second portion 132 between the drive power input position P10 and the second drive power output position P12.

A first torsional rigidity φ11 of the first portion 131 including the short length L11 is smaller than a second torsional rigidity φ12 of the second portion 132 including the long length L12 (φ11<φ12). Thus, in the second embodiment, the same effects as those in the first embodiment are obtained. In addition, because the outer diameter of the connecting shaft is uniform, that is, a contour of the cross section of the connecting shaft is uniform, a common configuration may be used for the first rotation portion 12 and for the second rotation portion 22. Consequently, the number of parts may be reduced.

Next, a third embodiment will be described with reference to FIGS. 6A to 6C. A configuration of a connecting shaft of a seat adjustment apparatus for a vehicle according to the third embodiment differs from that of the seat adjustment apparatus 1 for the vehicle of the first embodiment illustrated in FIGS. 1 to 4C. The other configurations of the seat adjustment apparatus of the third embodiment are almost same as those of the first embodiment. In the third embodiment, the same reference numerals designate the same configuration as those of the first embodiment, and the explanation thereabout will be omitted. A connecting shaft 230 (i.e., the connecting member) of the third embodiment, whose configuration differs from that of the first embodiment, will be mainly described hereunder.

The connecting shaft may be a hollow shaft of which thickness is uniform and of which outer diameter changes gradually. Each of FIGS. 6A to 6C is a schematic view for describing the hollow connecting shaft 230 of which the thickness is uniform and of which the outer diameter changes gradually. In each of FIGS. 6A to 6C, the connecting shaft 230 is illustrated schematically for convenience of the explanation. FIG. 6A is a side view of the connecting shaft 230 seen from a direction of a first end portion 234 of the connecting shaft 230. FIG. 6B is a front view of the connecting shaft 230. FIG. 6C is a side view of the connecting shaft 230 seen from a direction of a second end portion 235 of the connecting shaft 230.

A thickness t of the connecting shaft 230, which is the hollow shaft, is uniform. The rotational driving force from the electric motor 40 is transmitted to a gear (the drive power input member) which is arranged at the connecting shaft 230 in a vicinity of the first end portion 234. An outer diameter D21 of the first end portion 234 which is close to the gear is smaller than an outer diameter D22 of the second end portion 235 which is far from the gear (D21<D22). The outer diameter of the connecting shaft 230 increases linearly from the outer diameter D21 of the first end portion 234 to the outer diameter D22 of the second end portion 235. An inner diameter D23 of the first end portion 234 which is close to the gear is smaller than an inner diameter D24 of the second end portion 235 which is far from the gear (D23<D24). The inner diameter of the connecting shaft 230, which is the hollow shaft, increases linearly from the inner diameter D23 of the first end portion 234 to the inner diameter 24 of the second end portion 235.

The gear is attached to the connecting shaft 230 at a drive power input position P20, The first end portion 234 of the connecting shaft 230 is attached to the first reclining mechanism 10 at a first drive power output position P21. The second end portion 235 of the connecting shaft 230 is attached to the second reclining mechanism 20 at a second drive power output position P22. A length L21 of the first portion 231 between the drive power input position P20 and the first drive power output position P21 is shorter than a length L22 of the second portion 232 between the drive power input position P20 and the second drive power output position P22. A first torsional rigidity 4321 of the first portion 231 including the short length L21 is smaller than a second torsional rigidity φ22 of the second portion 232 including the long length L22 (φ21<φ22). Thus, in the third embodiment, the same effects as those in the first embodiment are obtained.

Next, a fourth embodiment will be described with reference to FIGS. 7A to 7C. A configuration of a connecting shaft of a seat adjustment apparatus for a vehicle according to the fourth embodiment differs from that of the seat adjustment apparatus 1 for the vehicle of the first embodiment illustrated in FIGS. 1 to 4C. The other configurations of the seat adjustment apparatus of the fourth embodiment are almost same as those of the first embodiment. In the fourth embodiment, the same reference numerals designate the same configuration as those of the first embodiment, and the explanation thereabout will be omitted. A connecting shaft 330 (i.e., the connecting member) of the fourth embodiment, whose configuration differs from that of the first embodiment, will be mainly described hereunder.

The connecting shaft may be a hollow shaft of which outer diameter is uniform and of which inner diameter includes a stepped configuration. Each of FIGS. 7A to 7C is a schematic view for describing the hollow connecting shaft 330 of which the outer diameter is uniform and of which the inner diameter includes the stepped configuration. In each of FIGS. 7A to 7C, the connecting shaft 330 is illustrated schematically for convenience of the explanation. FIG. 7A is a side view of the connecting shaft 330 seen from a direction of a first end portion 334 of the connecting shaft 330. FIG. 7B is a front view of the connecting shaft 330. FIG. 7C is a side view of the connecting shaft 330 seen from a direction of a second end portion 335 of the connecting shaft 330.

An outer diameter D31 of the connecting shaft 330 is uniform. The rotational driving force from the electric motor 40 is transmitted to a gear (the drive power input member) which is arranged at the connecting shaft 330 in a vicinity of the first end portion 334. An inner diameter D32 of the first end portion 334 which is close to the gear is larger than an inner diameter D33 of the second end portion 335 which is far from the gear (D32>D33). A configuration of the cross section of a hollow portion of the connecting shaft 330 is changed at a step portion 333 which is provided at an intermediate portion between the first end portion 334 and the second end portion 335.

The gear is attached to the connecting shaft 330 at a drive power input position P30. The first end portion 334 of the connecting shaft 330 is attached to the first reclining mechanism 10 at a first drive power output position P31. The second end portion 335 of the connecting shaft 330 is attached to the second reclining mechanism 20 at a second drive power output position P32. The inner diameter D32 of a first portion 331 between the drive power input position P30 and the first drive power output position P31 is larger than the inner diameter D33 of a second portion 332 between the drive power input position P30 and the second drive power output position P32. A length L31 of the first portion 331 is shorter than a length L32 of the second portion 332.

A first torsional rigidity φ31 of the first portion 331 including the short length L31 is smaller than a second torsional rigidity φ32 of the second portion 332 including the long length L32 (φ31<φ32). Thus, in the fourth embodiment, the same effects as those in the first embodiment are obtained.

Next, a fifth embodiment will be described with reference to FIGS. 8A to 8C. A configuration of a connecting shaft of a seat adjustment apparatus for a vehicle according to the fifth embodiment differs from that of the seat adjustment apparatus 1 for the vehicle of the first embodiment illustrated in FIGS. 1 to 4C. The other configurations of the seat adjustment apparatus of the fifth embodiment are almost same as those of the first embodiment. In the fifth embodiment, the same reference numerals designate the same configuration as those of the first embodiment, and the explanation thereabout will be omitted. A connecting shaft 430 (i.e., the connecting member) of the fifth embodiment, whose configuration differs from that of the first embodiment, will be mainly described hereunder.

The connecting shaft may be the shaft of which outer diameter is uniform, and which includes a hollow portion and a solid portion. Each of FIGS. 8A to 8C is a schematic view for describing the connecting shaft 430 of which the outer diameter is uniform, and which includes the hollow portion and the solid portion. In each of FIGS. 8A to 8C, the connecting shaft 430 is illustrated schematically for convenience of the explanation. FIG. 8A is a side view of the connecting shaft 430 seen from a direction of a first end portion 434 of the connecting shaft 430. FIG. 8B is a front view of the connecting shaft 430. FIG. 8C is a side view of the connecting shaft 430 seen from a direction of a second end portion 435 of the connecting shaft 430.

An outer diameter D41 of the connecting shaft 430 is uniform. The rotational driving force from the electric motor 40 is transmitted to a gear (the drive power input member) which is arranged at the connecting shaft 430 in a vicinity of the first end portion 434. The gear is attached at a drive power input position P40. The first end portion 434 of the connecting shaft 430 is attached to the first reclining mechanism 10 at a first drive power output position P41. The second end portion 435 of the connecting shaft 430 is attached to the second reclining mechanism 20 at a second drive power output position P42. A first portion 431 between the drive power input position P40 and the first drive power output position P41 corresponds to the hollow portion including an inner diameter D42. A second portion 432 between the drive power input position P40 and the second drive power output position P42 corresponds to the solid portion.

A length L41 of the first portion 431 is shorter than a length L42 of the second portion 432. A first torsional rigidity φ41 of the first portion 431 including the short length L41 is smaller than a second torsional rigidity φ42 of the second portion 432 including the long length L42 ($\phi 41 < \phi 42$). Thus, in the fifth embodiment, the same effects as those in the first embodiment are obtained.

According to the second to fifth embodiments which are illustrated in FIGS. 5A to 8C, the cross section of each the connecting shafts 130, 230, 330, 430 is illustrated as the circle. However, in a similar manner to the first embodiment, the cross section of the connecting shaft 130, 230, 330, 430 is not limited to the circular shape and may have a polygon shape, including, for example, a triangular shape, a rectangular shape, a pentagonal shape, a hexagonal shape, an octagonal shape, or may have an elliptical shape. In addition, each of the connecting shafts 130, 230, 330, 430 may be a spline shaft (a shaft with grooves provided thereto) or a serrated shaft. In addition, the cross section of the hollow portion of the connecting shaft 130, 230, 330, 430 is not limited to the circular shape and may have a polygon shape, including, for example, a triangular shape, a rectangular shape, a pentagonal shape, a hexagonal shape, an octagonal shape, or may have an elliptical shape.

In the first to fifth embodiments, the torsional rigidity of the portion of which the length is short is smaller than the torsional rigidity of the portion of which the length is long because, at the beginning of the actuation, the torque required to actuate the first reclining mechanism 10 and the torque required to actuate the second reclining mechanism 20 are substantially the same. However, the torsional rigidities are not limited thereto. For example, in a case where the torque required to actuate the first reclining mechanism 10 is larger than the torque required to actuate the second reclining mechanism 20 at the beginning of the actuation, the first torsional rigidity of the first portion of the connecting shaft may be larger than the second torsional rigidity of the second portion of the connecting shaft. Thus, the rotation angles are substantially the same as each other between both end portions of the connecting shaft.

The rotation angles may be the same, on the design, as each other between both end portions of the connecting shaft, and some error of the rotation angles caused in actual manufacturing of the apparatus is included in substantially the same rotation angles. In addition, the difference in the rotation angles, the difference which does not cause the feeling of discomfort to the occupant, is included in the substantially same rotation angle.

According to the aforementioned embodiments, in a case where the drive power is transmitted from the gear (i.e., the drive power input member) via the connecting shaft (i.e., the connecting member) to the plural reclining mechanisms (i.e., the seat adjustment mechanisms), the difference in the operation amounts between the plural reclining mechanisms is reduced by making the torsional rigidities of the plural portions of the connecting shaft differ from each other. Thus, at the time of start-up, the plural reclining mechanisms are operated at the same time, In the aforementioned embodiments, as an example, the explanations are made on the reclining mechanism serving as the seat adjustment mechanism. However, this disclosure is not limited to the reclining mechanism. In place of the reclining mechanism, for example, a seat slide mechanism, a seat elevating/lowering mechanism, a seat tilt mechanism or a seat cushion adjustment mechanism may be used as the seat adjustment mechanism.

The seat slide mechanism is the seat adjustment mechanism which adjusts a position of a seat for a vehicle in a front/rear direction of the vehicle relative to a floor surface of the vehicle. The seat elevating/lowering mechanism is the seat adjustment mechanism which adjusts a position of the seat for the vehicle in an up/down direction relative to the floor surface of the vehicle. The seat tilt mechanism is the seat adjustment mechanism which adjusts a tilt or inclination of the seat for the vehicle in the front/rear direction relative to the floor surface of the vehicle. The seat cushion adjustment mechanism is the seat adjustment mechanism which adjusts a shape or configuration of the seat cushion. The embodiments disclosed here may be applied to the seat adjustment apparatus for the vehicle, at which the connecting shaft (i.e., the connecting member) connecting the pair of reclining mechanisms (i.e., the pair of seat adjustment mechanisms) which are mentioned above is driven by the drive power of the electric motor (i.e., the drive source).

According to the aforementioned embodiments, the seat adjustment apparatus 1 for the vehicle includes the pair of first and second reclining mechanisms 10, 20 for adjusting the seat 50 for the vehicle, the electric motor 40 provided between the pair of first and second reclining mechanisms 10, 20, the electric motor 40 being positioned close to one of the pair of first and second reclining mechanisms 10, 20 and being positioned far from the other one of the pair of first and second reclining mechanisms 10, 20, and the connecting shaft 30, 130, 230, 330, 430 transmitting the drive power from the electric motor 40 to the pair of first and second reclining mechanisms 10, 20, wherein the connecting shaft 30, 130, 230, 330, 430 includes the first portion 31, 38, 131, 231, 331, 431 transmitting the drive power to the one of the pair of first and second reclining mechanisms 10, 20 and having the first torsional rigidity $\phi 1$, $\phi 11$, $\phi 21$, $\phi 31$, $\phi 41$, the connecting shaft 30, 130, 230, 330, 430 includes the second portion 32, 39, 132, 232, 332, 432 transmitting the drive power to the other one of the pair of first and second reclining mechanisms 10, 20 and having the second torsional rigidity $\phi 2$, $\phi 12$, $\phi 22$, $\phi 32$, $\phi 42$, and the first torsional rigidity $\phi 1$, $\phi 11$, $\phi 21$, $\phi 31$, $\phi 41$ differs from the second torsional rigidity $\phi 2$, $\phi 12$, $\phi 22$, $\phi 32$, $\phi 42$.

According to the above-described configuration, the difference in the operation amounts between the first reclining mechanism 10 and the second reclining mechanism 20 is reduced.

According to the aforementioned embodiments, the first torsional rigidity $\phi 1$, $\phi 11$, $\phi 21$, $\phi 31$, $\phi 41$ of the first portion 31, 38, 131, 231, 331, 431 is smaller than the second torsional rigidity $\phi 2$, $\phi 12$, $\phi 22$, $\phi 32$, $\phi 42$ of the second portion 32, 39, 132, 232, 332, 432, According to the aforementioned embodiments, the drive power of the electric motor 40 is inputted to the connecting shaft 30, 130, 230, 330, 430 at the drive power input position P0, P10, P20, P30, P40, the drive power is outputted from the first portion 31, 38, 131, 231, 331, 431 of the connecting shaft 30, 130, 230, 330, 430 to the one of the pair of first and second reclining mechanisms 10, 20 at the first drive power output position P1, P11, P21, P31, P41, the drive power is outputted from the second portion 32, 39, 132, 232, 332, 432 of the connecting shaft 30, 130, 230, 330, 430 to the other one of the pair of first and second reclining mechanisms 10, 20 at the second drive power output position P2, P12, P22, P32, P42, and the first torsional rigidity $\phi 1$, $\phi 11$, $\phi 21$, $\phi 31$, $\phi 41$ of the first portion 31, 38, 131, 231, 331, 431 and the second torsional rigidity $\phi 2$, $\phi 12$, $\phi 22$, $\phi 32$, $\phi 42$ of the second portion 32, 39, 132, 232, 332, 432 are set so that the rotation angle $\theta 1$ of the connecting shaft 30, 130, 230, 330, 430 at the first drive power output position P1, P11, P21, P31, P41 relative to the drive power input position P0, P10, P20, P30, P40 equals to the rotation angle $\theta 2$ of the connecting shaft 30, 130, 230,

330, 430 at the second drive power output position P2, P12, P22, P32, P42 relative to the drive power input position P0, P10, P20, P30, P40.

According to the aforementioned embodiments, in a case where the first torque T1 for driving the one of the pair of first and second reclining mechanisms 10, 20 differs from the second torque T2 for driving the other one of the pair of first and second reclining mechanisms 10, 20, the first torsional rigidity $\phi 1$, $\phi 11$, $\phi 21$, $\phi 31$, $\phi 41$ and the second torsional rigidity $\phi 2$, $\phi 12$, $\phi 22$, $\phi 32$, $\phi 42$ are set so that the first torque T1 is generated at the first drive power output position P1, P11, P21, P31, P41 and the second torque T2 is generated at the second drive power output position P2, P12, P22, P32, P42.

According to the aforementioned embodiments, the polar moment of inertia of area of the first portion 31, 38, 131, 231, 331, 431 differs from the polar moment of inertia of area of the second portion 32, 39, 132, 232, 332, 432.

According to the aforementioned embodiments, the shear modulus of elasticity of the first portion 31, 38, 131, 231, 331, 431 differs from the shear modulus of elasticity of the second portion 32, 39, 132, 232, 332, 432.

According to the aforementioned embodiments, the first portion 31, 131, 231, 331, 431 and the second portion 32, 132, 232, 332, 432 are formed to be integral with each other.

According to the aforementioned embodiments, the first portion 38 and the second portion 39 are formed to be separate from each other.

According to the aforementioned embodiments, the pair of seat adjustment mechanism 10, 20 corresponds to the reclining mechanism, the seat slide mechanism, the seat elevating/lowering mechanism, the seat tilt mechanism or the seat cushion adjustment mechanism.

According to the aforementioned embodiments, the first portion 31, 38, 131, 231, 331, 431 includes a configuration of a cross section which differs from a configuration of a cross section of the second portion 32, 39, 132, 232, 332, 432.

According to the aforementioned embodiments, each of the configuration of the cross section of the first portion 31 and the configuration of the cross section of the second portion 32 is circular, and the diameter D1 of the configuration of the cross section of the first portion 31 is smaller than the diameter D2 of the cross section of the second portion 32.

The principles, preferred embodiments and mode of operation of the present invention have been described in the foregoing specification. However, the invention which is intended to be protected is not to be construed as limited to the particular embodiments disclosed, Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A seat adjustment apparatus for a vehicle, the seat adjustment apparatus comprising:
    a pair of seat adjustment mechanisms for adjusting a seat for the vehicle;
    a drive source provided between the pair of seat adjustment mechanisms, the drive source being positioned adjacent to one of the pair of seat adjustment mechanisms; and
    a connecting member transmitting a drive power from the drive source to the pair of seat adjustment mechanisms, wherein
    the connecting member includes a first portion transmitting the drive power to the one of the pair of seat adjustment mechanisms and having a first torsional rigidity,
    the connecting member includes a second portion transmitting the drive power to the other one of the pair of seat adjustment mechanisms and having a second torsional rigidity,
    the connecting member includes a step portion between the first connecting member and the second connecting member,
    the drive power of the drive source is inputted to an external surface of the connecting member via a drive power input position at the step portion, and
    the first torsional rigidity differs from the second torsional rigidity.

2. The seat adjustment apparatus according to claim 1, wherein the first torsional rigidity of the first portion is smaller than the second torsional rigidity of the second portion.

3. The seat adjustment apparatus according to claim 2, wherein
    the drive power is outputted from the first portion of the connecting member to the one of the pair of seat adjustment mechanisms at a first drive power output position,
    the drive power is outputted from the second portion of the connecting member to the other one of the pair of seat adjustment mechanisms at a second drive power output position, and
    the first torsional rigidity of the first portion and the second torsional rigidity of the second portion are set so that a rotation angle of the connecting member at the first drive power output position relative to the drive power input position equals to a rotation angle of the connecting member at the second drive power output position relative to the drive power input position.

4. The seat adjustment apparatus according to claim 2, wherein a polar moment of inertia of area of the first portion differs from a polar moment of inertia of area of the second portion.

5. The seat adjustment apparatus according to claim 2, wherein a shear modulus of elasticity of the first portion differs from a shear modulus of elasticity of the second portion.

6. The seat adjustment apparatus according to claim 1, wherein
    the drive power is outputted from the first portion of the connecting member to the one of the pair of seat adjustment mechanisms at a first drive power output position,
    the drive power is outputted from the second portion of the connecting member to the other one of the pair of seat adjustment mechanisms at a second drive power output position, and
    the first torsional rigidity of the first portion and the second torsional rigidity of the second portion are set so that a rotation angle of the connecting member at the first drive power output position relative to the drive power input position equals to a rotation angle of the connecting member at the second drive power output position relative to the drive power input position.

7. The seat adjustment apparatus according to claim 6, wherein
    a first torque for driving the one of the pair of seat adjustment mechanisms differs from a second torque for driving the other one of the pair of seat adjustment mechanisms, and the first torsional rigidity and the second torsional rigidity are set so that the first torque is generated at the first drive power output position and the second torque is generated at the second drive power output position.

8. The seat adjustment apparatus according to claim 7, wherein a polar moment of inertia of area of the first portion differs from a polar moment of inertia of area of the second portion.

9. The seat adjustment apparatus according to claim 7, wherein a shear modulus of elasticity of the first portion differs from a shear modulus of elasticity of the second portion.

10. The seat adjustment apparatus according to claim 6, wherein a polar moment of inertia of area of the first portion differs from a polar moment of inertia of area of the second portion.

11. The seat adjustment apparatus according to claim 6, wherein a shear modulus of elasticity of the first portion differs from a shear modulus of elasticity of the second portion.

12. The seat adjustment apparatus according to claim 1, wherein a polar moment of inertia of area of the first portion differs from a polar moment of inertia of area of the second portion.

13. The seat adjustment apparatus according to claim 12, wherein a shear modulus of elasticity of the first portion differs from a shear modulus of elasticity of the second portion.

14. The seat adjustment apparatus according to claim 1, wherein a shear modulus of elasticity of the first portion differs from a shear modulus of elasticity of the second portion.

15. The seat adjustment apparatus according to claim 1, wherein the first portion and the second portion are formed to be integral with each other.

16. The seat adjustment apparatus according to claim 1, wherein the first portion and the second portion are formed to be separate from each other.

17. The seat adjustment apparatus according to claim 1, wherein the pair of seat adjustment mechanisms corresponds to a reclining mechanism, a seat slide mechanism, a seat elevating and lowering mechanism, a seat tilt mechanism or a seat cushion adjustment mechanism.

18. The seat adjustment apparatus according to claim 1, wherein the first portion includes a configuration of a cross section which differs from a configuration of a cross section of the second portion.

19. The seat adjustment apparatus according to claim 18, wherein each of the configuration of the cross section of the first portion and the configuration of the cross section of the second portion is circular, and a diameter of the configuration of the cross section of the first portion is smaller than a diameter of the cross section of the second portion.

20. The seat adjustment apparatus according to claim 1, wherein the drive source is an electric motor that rotates the connecting member.

* * * * *